Feb. 25, 1969     C. C. GAMBILL     3,430,166
TEMPERATURE RESPONSIVE MAGNETICALLY ACTUATED SWITCH
Filed Aug. 2, 1965     Sheet __1__ of 2
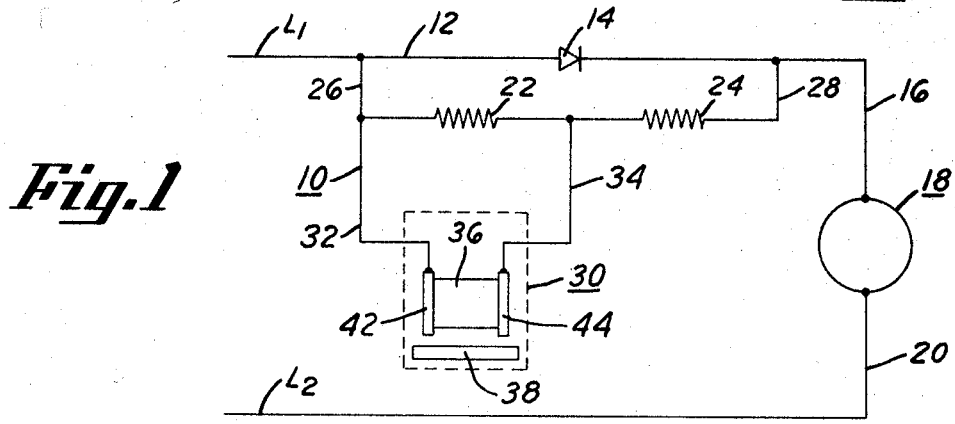
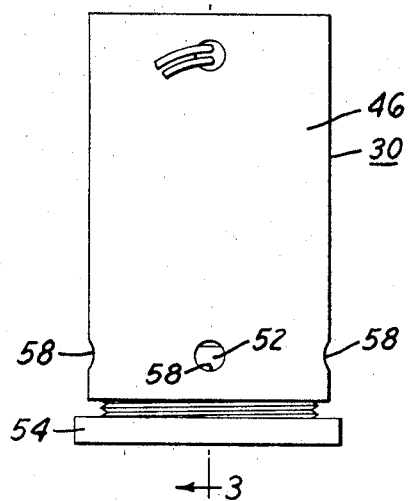
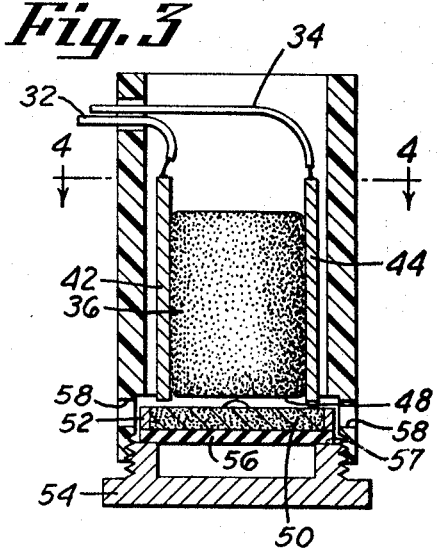
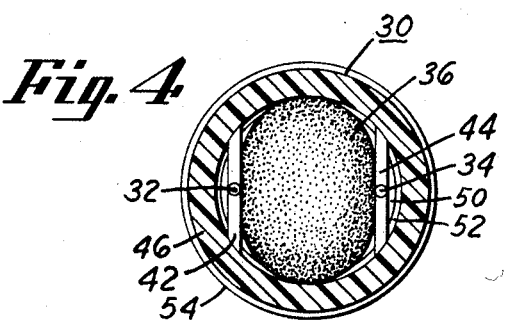
INVENTOR.
CHARLES C. GAMBILL
BY J.C. Evans
ATTORNEY INVENTOR.
CHARLES C. GAMBILL
BY
J.C. Evans
ATTORNEY

United States Patent Office 3,430,166
Patented Feb. 25, 1969

3,430,166
TEMPERATURE RESPONSIVE MAGNETICALLY
ACTUATED SWITCH
Charles C. Gambill, Tipp City, Ohio, assignor to General
Motors Corporation, Detroit, Mich., a corporation of
Delaware
Filed Aug. 2, 1965, Ser. No. 476,396
U.S. Cl. 335—146          2 Claims
Int. Cl. H01h 51/00, 61/00

ABSTRACT OF THE DISCLOSURE

In preferred form, a temperature responsive switch in which a conductive member having a magnetic inversion point at a predetermined temperature is a switching and conducting element. When the environmental temperature is great enough to impart magnetic qualities to the conductive member, a resilient permanent magnet enclosed in a housing attracts the conductive element against conductor members which are secured in the housing by the expansive spring bias of the resilient permanent magnet. When the environmental temperature is not great enough to impart magnetic properties to the conductive member, no magnetically actuated switching movement occurs and the conductive member remains in a normal position out of contact with the conductor members.

---

This invention is directed to electrical control circuits and more particularly to electrical control circuits including thermally responsive electrical switches.

In the control of many electrical systems, it is desirable to include temperature responsive switches therein to condition the electrical control system in response to temperature for varying the controlling action thereof. Such switches take a wide variety of forms that can utilize thermally expansible polymetallic members, thermally expansible fluids and solids and the like to sense and respond to temperature so as to make and break contact pairs.

An object of the present invention is to improve thermally responsive switches by the provision therein of a movable, electrically conductive member that has a magnetic inversion point at a predetermined temperature wherein the member is movable by the field of a permanent magnet to complete an electrical circuit through the conductive member.

A further object of the present invention is to improve temperature responsive switches by the provision of an electrically conductive member that is selectively movable at a predetermined temperature in response to the field of a permanent magnet to open a first predetermined circuit and to close a second predetermined circuit through the conductive member.

A further object of the present invention is to improve motor speed control circuits of the type utilizing a direct-current component for producing a dynamic braking phenomenon as a governor control of the speed of the motor by the provision in the control circuit of a temperature responsive switch including a movable conductive member responsive to a predetermined temperature to be attracted by a permanent magnet into electrical contact with portions of a modulating circuit for modifying the degree of dynamic braking of the electrical motor.

Further objects and advantages of the present invention will be apparent from the following description, reference being had to the accompanying drawings wherein preferred embodiments of the present invention are clearly shown.

In the drawings:

FIGURE 1 is a diagrammatic view of an electrical motor speed control circuit including the switch of the present invention;

FIGURE 2 is a view in elevation of the improved switch;

FIGURE 3 is a view in vertical section taken along the line 3—3 of FIGURE 2;

FIGURE 4 is a view in horizontal section taken along the line 4—4 of FIGURE 3;

Figure 5:
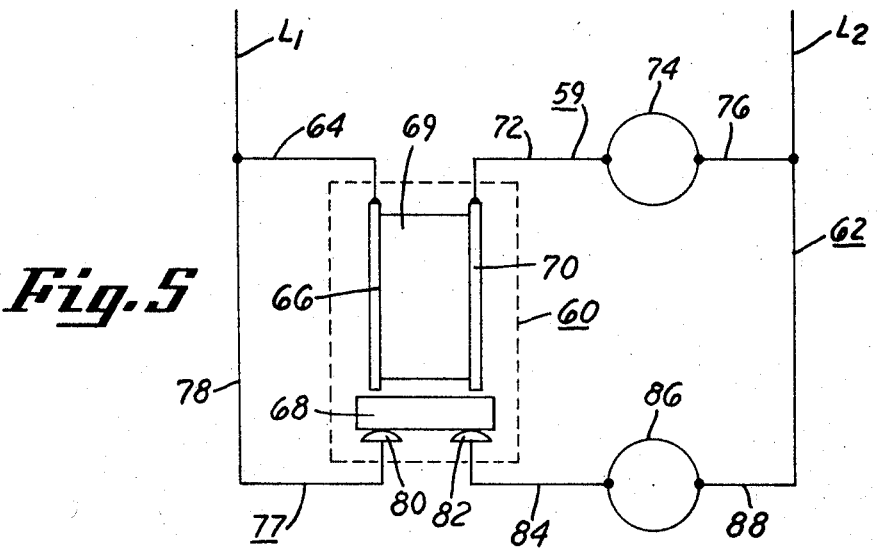
FIGURE 5 is a diagrammatic view of an electrical warning system including another embodiment of the switch of the present invention.

Referring now to the drawings, in FIGURE 1 a motor speed control circuit 10 is illustrated including wires $L_1$, $L_2$ of a suitable source of alternating current power. The wire $L_1$ is connected to a conductor 12 having a diode 14 therein which is connected by a conductor 16 to one end of the winding of an induction-type motor 18. The opposite end of the winding is connected by a conductor 20 to the wire $L_2$. Resistors 22, 24 are electrically connected across the diode 14 by conductors 26 and 28. The resistor 22 is selectively shunted by a temperature responsive switch 30 connected thereacross by conductors 32, 34. The switch 30 includes a permanent magnet 36 and a movable conductive member 38 responsive to a predetermined temperature to be conditioned so as to be attracted by the permanent magnet 36 into electrical contact with terminals 42 and 44, respectively, connected to the conductors 32 and 34 so as to shunt the resistance 22.

The control system 10 relies upon dynamic braking to control speed of motor 18 in the following manner. During a first predetermined temperature range when the switch 30 is open, the combined resistances of resistors 22, 24 produce a predetermined magnitude of alternating current and direct current components across the winding of the motor 18 to produce a first predetermined speed output therefrom. When the resistance 22 is shunted, the resulting half-wave rectified current across the diode 14 is modified to produce a dynamic braking effect different than was previously the case so as to result in a second predetermined operation of the motor 18. The principle of dynamic braking forms no part of the present invention and for a more explicit explanation of such speed control, reference is made to United States Patent No. 2,419,431, issued Apr. 22, 1947.

In accordance with certain of the principles of the present invention, however, the variation of the direct current power component across the diode 14, as effected by shunting the resistor 22, is accomplished by means of an improved temperature responsive switch 30 which is particularly set forth in FIGURES 2 through 4 as including, in addition to permanent magnet 36, the movable temperature responsive conductive member 38 and the terminals 42, 44, as set forth above, a tubular outer housing 46 constructed of a suitable electrical insulating material. The permanent magnet 36 is of cylindrical form and consists of a resilient electrically insulating base material embedded with ferrites. The cylindrical permanent magnet 36 has sufficient resiliency to spring bias the terminal plates 42, 44 into press fit engagement with the inner surface of the outer housing 46, as best seen in FIGURE 4. The magnet 36 in the illustrated arrangement has the bottom end 48 thereof located in close spaced relationship with the bottom ends of the terminals 42, 44 at a location spaced inwardly of their ends. Below the terminals 42, 44 is located an electrically conductive member 50 of the type that has a magnetic inversion at a predetermined temperature. A preferred material is chrome modified manganese antimonide of the general formula $Cr_xMm_2$-$xSb$ that has an unusually sensitive transition temperature below which it is nonmagnetic and above which it becomes magnetically responsive. In the illustrated arrangement the conductive member 50 includes an outer ring 52 of a good electrically conductive material such as beryllium. The member 50 is located in spaced relationship below the ends of the electrically conductive terminals 42, 44 by an adjusting member or screw 54 axially movable within an end of housing 46. The adjusting screw 54 has a seating surface 57 which is perpendicular to the axis of housing 46. The adjusting screw 54 in the illustrated arrangement is electrically insulated from the conductive member 50 by a spacer 56. Spacer 56 and conductive member 50 rest on seating surface 57 perpendicular to the axis of housing 46. The housing includes a plurality of circumferentially located openings 58 therein through which convective air currents can pass to vary the temperature of the conductive member 50.

Thus, in cases where the control circuit 10 varies the speed of a fan motor in an air conditioner, the housing 46 of the switch 30 can be located within the room being cooled by the air conditioner whereby the air in the room can pass through the openings 58 into heat transfer relationship with the conductive member 50. Upon the occurrence of a predetermined temperature in the room, the conductive member 50 will become magnetized and will thereby be attracted by the permanent magnet 36 upwardly against the terminals 42, 44 whereby the resistance 22 will be shunted to vary the speed of the motor 18 in response to the predetermined temperature in the room to vary the amount of cooled air being circulated in the room. The ring 52 assures good electrical contact between the member 50 and the terminals 42, 44 and while preferred can be omitted in certain switch arrangements.

When the temperature of the room drops below the predetermined temperature, the conductive member 50 will be rendered nonmagnetic and thereby will drop away from the permanent magnet into the position shown in FIGURE 3 whereby the resistor 22 will be included in the control circuit 10 to vary the speed of operation of the motor 18 to produce a different cooling effect from an associated system such as an air conditioner.

In accordance with certain other of the principles of the present invention in FIGURE 5 a modified temperature responsive switch 60 is shown in association with a warning or indicator circuit 62 connected across wires $L_1$, $L_2$ of a suitable alternating power source. In this arrangement a first electrically energizable indicating circuit 59 is included that has a conductor 64 connected to the wire $L_1$ which in turn is connected to an electrical conductor strip 66 which is operatively associated with a temperature responsive magnetizable conductor disc 68 like member 50 in the first embodiment. The circuit 59 also includes an electrically conductive strip 70 which in turn is connected by a conductor 72 to a warning light 74 which is connected by a conductor 76 to wire $L_2$. The circuit 62 further includes a warning circuit 77 including a conductor 78 from wire $L_1$ that is electrically connected to a contact 80 which is operatively associated through the conductor disc 68 with another contact 82 that is electrically connected by a conductor 84 to a second warning light 86 which is connected to the wire $L_2$ by a conductor 88.

In this embodiment of the invention, the temperature responsive conductor disc 68 is a material such as that discussed in the first embodiment that is normally nonmagnetic below a predetermined temperature and ferrimagnetic above said predetermined temperature. Accordingly, the switch 60 can be arranged within a freezer compartment so that the conductive disc 68 will sense the temperature of the air in the freezer compartment and be responsive thereto in the following manner.

When the temperature is below a predetermined point, the disc 68 will assume a position as shown in FIGURE 5 to complete a circuit across contacts 80, 82 whereby the light 86 will be energized to indicate that the temperature of the freezer compartment is in a safe operating range. When the temperature in the freezer compartment increases above a predetermined temperature, the disc 68 will be rendered magnetizable and thereby will be attracted by a permanent magnet 69 out of electrical contact with the contacts 80, 82 to turn off the light 86 and move into electrical contact with the conductor strips 66, 70 to energize the light 74 to indicate that the temperature of the food storage compartment is above its desired operating range.

Figure 6:
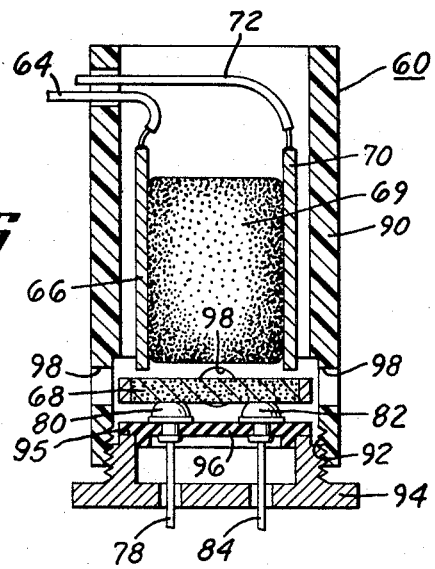
FIGURE 6 is a view in vertical section of the modified switch in FIGURE 5.

The switch 60 is more particularly illustrated in FIGURE 6 as including a tubular housing 90 of a suitable electrical insulating material having an opened end 92 into which is movably secured an adjusting member or screw 94. The adjusting screw 94 has a seating surface 95 which is perpendicular to the axis of housing 90. The adjusting screw 94 has an electrical insulating member 96 on the seating surface 95 thereof which carries the contacts 80, 82. When the conductive disc member 68 is conditioned as shown in FIGURE 5, it is supported by the contacts 80, 82 as shown in FIGURE 6 to be in spaced relationship and out of electrical contact with the conductor discs 66, 70. The tubular housing 60 includes a plurality of circumferentially spaced openings 98 therein like the openings 58 in the first embodiment whereby air surrounding the housing 60 is free to pass into heat exchange relationship with the disc 68 for varying the temperature thereof to change the magnetic properties thereof. In this embodiment, as was the case in the embodiment of FIGURES 2 through 4, the conductor strips 66, 70 are biased into press fit engagement with housing 60 by the permanent magnet 69 which is of a resilient electrical insulating material including embedded ferrimagnetic particles therein.

While the emobdiments of the present invention as herein disclosed constitute preferred forms, it is to be understood that other forms might be adopted.

What is claimed is as follows:

1. A thermally responsive switch comprising, a tubular housing of electrical insulating material having an open end, a pair of conductor members located within said housing in spaced relationship with one another, a resilient permanent magnet member disposed between said conductor members and biasing said members apart into press fit engagement with said tubular housing, an adjusting member closing said open housing and including a seat located within said housing and movable axially of said housing, a movable temperature responsive electrically conductive member supported on said movable seat in spaced relationship with said conductor members, said conductive member being conditioned upon sensing a predetermined temperature to become magnetic, said conductive member upon becoming magnetic being attracted by said permanent magnet to be raised from said seat axially within the housing into electrical contact with said conductor members.

2. A thermally responsive switch comprising, a tubular housing of electrical insulating material having an open end, a pair of conductor members located within said housing in spaced relationship with one another, a resilient permanent magnet member disposed between said conductor members and biasing said members apart into press fit engagement with said tubular housing, an adjusting member closing said open housing and including a seat located within said housing and movable axially of said housing, a movable temperature responsive conductive member supported on said movable seat in spaced relationship with said conductor members, a pair of contacts on said movable seat electrically contacting said conductive member, said conductive member being conditioned upon sensing a predetermined temperature to become magnetic, said conductive member upon becoming magnetic being attracted by said permanent magnet to be raised from said seat axially within the housing into electrical contact with said conductor members and out of electrical contact with said pair of contacts.

References Cited

UNITED STATES PATENTS

| | | | |
|---|---|---|---|
| 3,057,978 | 10/1962 | Huetten | 335—208 |
| 3,206,573 | 9/1965 | Anderson | 335—146 |
| 3,230,718 | 1/1966 | Campbell | 335—208 |

BERNARD A. GILHEANY, *Primary Examiner.*

H. BROOME, *Assistant Examiner.*